(12) United States Patent
Lee et al.

(10) Patent No.: US 12,267,880 B2
(45) Date of Patent: *Apr. 1, 2025

(54) ALLOCATION OF RESOURCES FOR PREAMBLE AND PAYLOAD OF MESSAGES IN A 2-STEP RANDOM ACCESS (RA) PROCEDURE IN NEW RADIO (NR) SYSTEMS

(71) Applicant: Apple Inc., Cupertino, CA (US)

(72) Inventors: Anthony Lee, San Diego, CA (US); Seau S. Lim, Swindon (GB); Yongjun Kwak, Portland, OR (US); Youn Hyoung Heo, Seoul (KR)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,706

(22) Filed: Sep. 18, 2023

(65) Prior Publication Data
US 2024/0008099 A1    Jan. 4, 2024

Related U.S. Application Data

(63) Continuation of application No. 17/276,080, filed as application No. PCT/US2019/053286 on Sep. 26, 2019, now Pat. No. 11,825,525.
(Continued)

(51) Int. Cl.
*H04W 72/0453*    (2023.01)
*H04W 72/1263*    (2023.01)
(Continued)

(52) U.S. Cl.
CPC ... *H04W 74/0841* (2013.01); *H04W 72/0453* (2013.01); *H04W 72/1263* (2013.01);
(Continued)

(58) Field of Classification Search
CPC ......... H04W 74/0841; H04W 72/0453; H04W 72/1263; H04W 74/006; H04W 74/0866;
(Continued)

(56) References Cited

U.S. PATENT DOCUMENTS

| | | |
|---|---|---|
| 2017/0251499 A1 | 8/2017 | Radulsecu et al. |
| 2018/0110074 A1 | 4/2018 | Akkarakaran et al. |

(Continued)

FOREIGN PATENT DOCUMENTS

| | | |
|---|---|---|
| CN | 107889273 | 4/2018 |
| WO | 2018132843 A1 | 7/2018 |

(Continued)

OTHER PUBLICATIONS

Office Action for EP Patent Application No. 19867727.0; Jan. 4, 2024.
(Continued)

*Primary Examiner* — Thai Nguyen
(74) *Attorney, Agent, or Firm* — Kowert, Hood, Munyon, Rankin & Goetzel, P.C.

(57) ABSTRACT

Embodiments of a User Equipment (UE), Next Generation Node-B (gNB) and methods of communication are generally described herein. The UE may receive, from a gNB, configuration information related to a 2-step random access (RA) procedure between the UE and the gNB in unlicensed spectrum. The 2-step RA procedure may include: an uplink MsgA message that includes, within a random access occasion (RO), a MsgA preamble and a MsgA payload; and a downlink MsgB message that includes, within another RO, a MsgB PDCCH and a MsgB payload. The configuration information may indicate: resources allocated for the MsgA preamble; and a mapping between the resources allocated for the MsgA preamble and the MsgA payload. The UE may determine the resources allocated for the MsgA pay load
(Continued)

based on the resources allocated for the MsgA preamble and the mapping.

20 Claims, 6 Drawing Sheets

Related U.S. Application Data

(60) Provisional application No. 62/737,644, filed on Sep. 27, 2018.

(51) Int. Cl.
    *H04W 74/00*     (2009.01)
    *H04W 74/08*     (2009.01)
    *H04W 74/0833*     (2024.01)
    *H04W 76/19*     (2018.01)

(52) U.S. Cl.
    CPC ..... *H04W 74/006* (2013.01); *H04W 74/0866* (2013.01); *H04W 76/19* (2018.02)

(58) Field of Classification Search
    CPC . H04W 76/19; H04W 16/14; H04W 74/0833; H04W 72/0446; H04W 74/004; H04W 72/042; H04L 5/0048; H04L 5/0044
    See application file for complete search history.

(56) References Cited

U.S. PATENT DOCUMENTS

| | | |
|---|---|---|
| 2018/0124626 A1 | 5/2018 | Tsai et al. |
| 2018/0205516 A1 | 7/2018 | Jung et al. |
| 2020/0112994 A1* | 4/2020 | Zhang ................. H04L 27/2607 |
| 2020/0236716 A1* | 7/2020 | Lei ........................ H04L 5/0044 |
| 2021/0144776 A1 | 5/2021 | Xu |

FOREIGN PATENT DOCUMENTS

| | | |
|---|---|---|
| WO | 2018133437 A1 | 7/2018 |
| WO | 2020020332 | 1/2020 |

OTHER PUBLICATIONS

3rd Generation Partnership Project; Technical Specification Group Radio Access Network; Medium Access Control (MAC) Protocol Specification (Realease 15); 3GPP TS 25.321 V.15.0.0; Jun. 2018.
International Search Report and Written Opinion for International Application No. PCT/US2019/053286, date mailed Jan. 17, 2020, 9 pgs.
International Preliminary Report on Patentability for International Application No. PCT/US2019/053286, date mailed Oct. 5, 2020, 4 pgs.
Interdigital Communications, '2-step random access procedure', R1-1700703, 3GPP TSG RAN WG1 AH_NR Meeting, Spokane, USA, Jan. 10, 2017, 4 pgs.
Motorola Mobility, 'Physical channel design for 2-step RACH', R1-1700880, 3GPP TSG RAN WG1 Meeting NR, Spokane, USA, Jan. 17, 2017, 5 pgs.
Samsung, "NR 2-step Random Access Procedure", R1-1700892, 3GPP TSG RAN WG1 NR Ad Hoc, Spokane, USA, Jan. 2017, 5 pgs.
Ericsson, "NR two-step Random Access Procedure", R1-1700300, 3GPP TSG-RAN WG1 NR adhoc, Spokane, USA, Jan. 2017, 4 pgs.
Asustek, et al., Consideration on use cases of 2-step RACH Procedure, R2-1700356, 3GPP TSG-RAN WG2 Meeting #NR Ad Hoc, Spokane, USA, Jan. 2017, 4 pgs.
Huawei Technologies Co., et al., "pCR 45.820 NB M2M—Exception Report Latency", GPC150253, 3GPP TSG GERAN Adhoc#1 on FS_IoT_LC, Sophia-Antipolis, France, Apr. 2015, 5 pgs.
European Search Report, Application No. 19867727.0, mailed Aug. 11, 2021, 14 pgs.
Chinese Office Action; Chinese Application No. 201980060344.2; mailed Nov. 2, 2021; 16 pgs.

* cited by examiner

ALLOCATION OF RESOURCES FOR PREAMBLE AND PAYLOAD OF MESSAGES IN A 2-STEP RANDOM ACCESS (RA) PROCEDURE IN NEW RADIO (NR) SYSTEMS

PRIORITY CLAIM

This application is a continuation of U.S. application Ser. No. 17/276,080, filed on Mar. 12, 2021, titled "ALLOCATION OF RESOURCES FOR PREAMBLE AND PAYLOAD OF MESSAGES IN A 2-STEP RANDOM ACCESS (RA) PROCEDURE IN NEW RADIO (NR) SYSTEMS", which is a U.S. National Stage filing of International Application No. PCT/US2019/053286, filed Sep. 26, 2019, titled "ALLOCATION OF RESOURCES FOR PREAMBLE AND PAYLOAD OF MESSAGES IN A 2-STEP RANDOM ACCESS (RA) PROCEDURE IN NEW RADIO (NR) SYSTEMS", which claims the benefit of priority to U.S. Provisional Application No. 62/737,644, filed Sep. 27, 2018. All of the aforementioned applications are incorporated herein by reference in their entireties.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Embodiments pertain to wireless communications. Some embodiments relate to wireless networks including 3GPP (Third Generation Partnership Project) networks, and 3GPP LTE (Long Term Evolution) networks, Fifth Generation (5G) networks, and/or New Radio (NR) networks. Some embodiments relate to random access (RA) procedures, including a 2-step RA procedure. Some embodiments relate to allocation of resources for preamble and payload of messages in a 2-step RA procedure for NR systems.

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
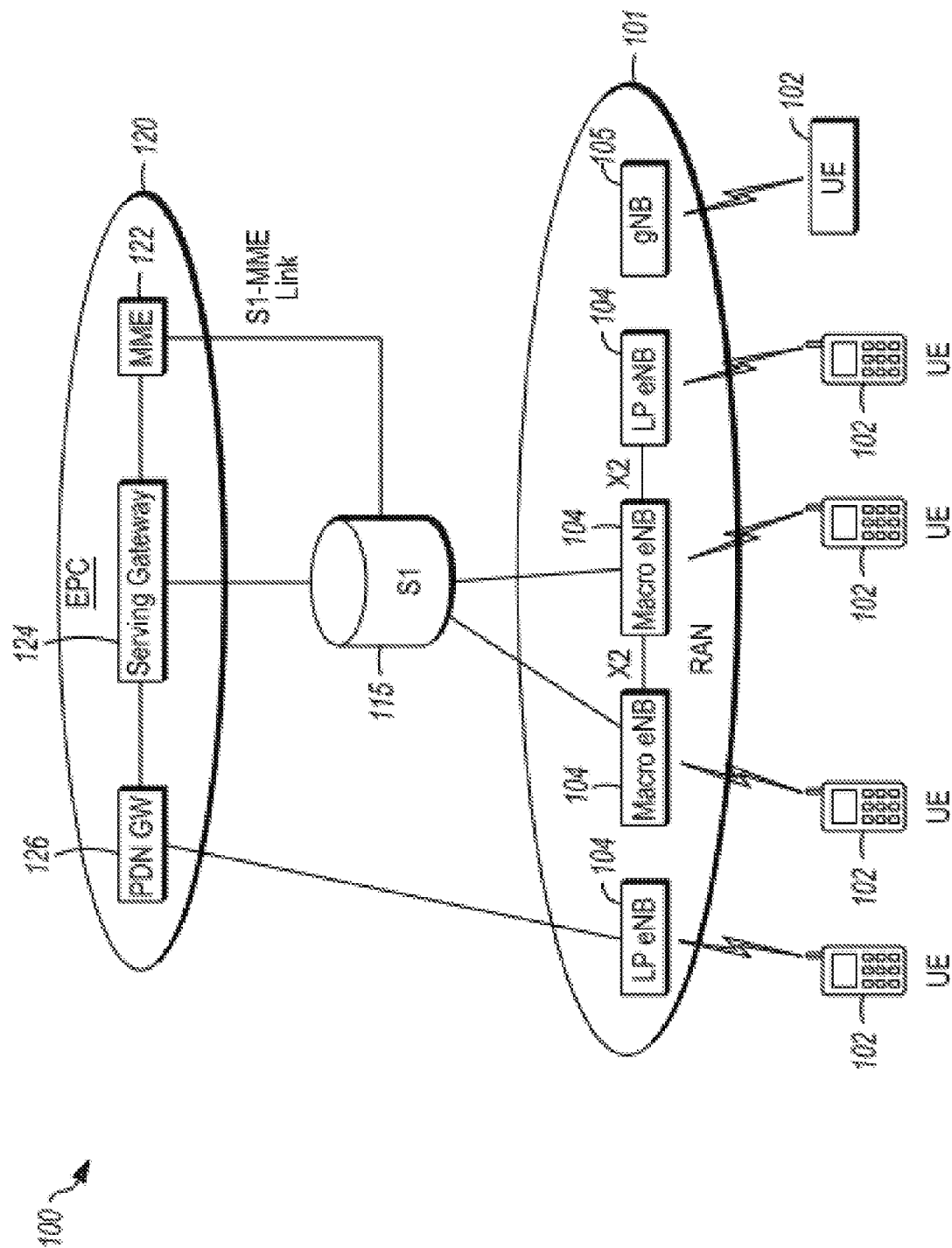
FIG. 1A is a functional diagram of an example network in accordance with some embodiments.
Figure 1B:
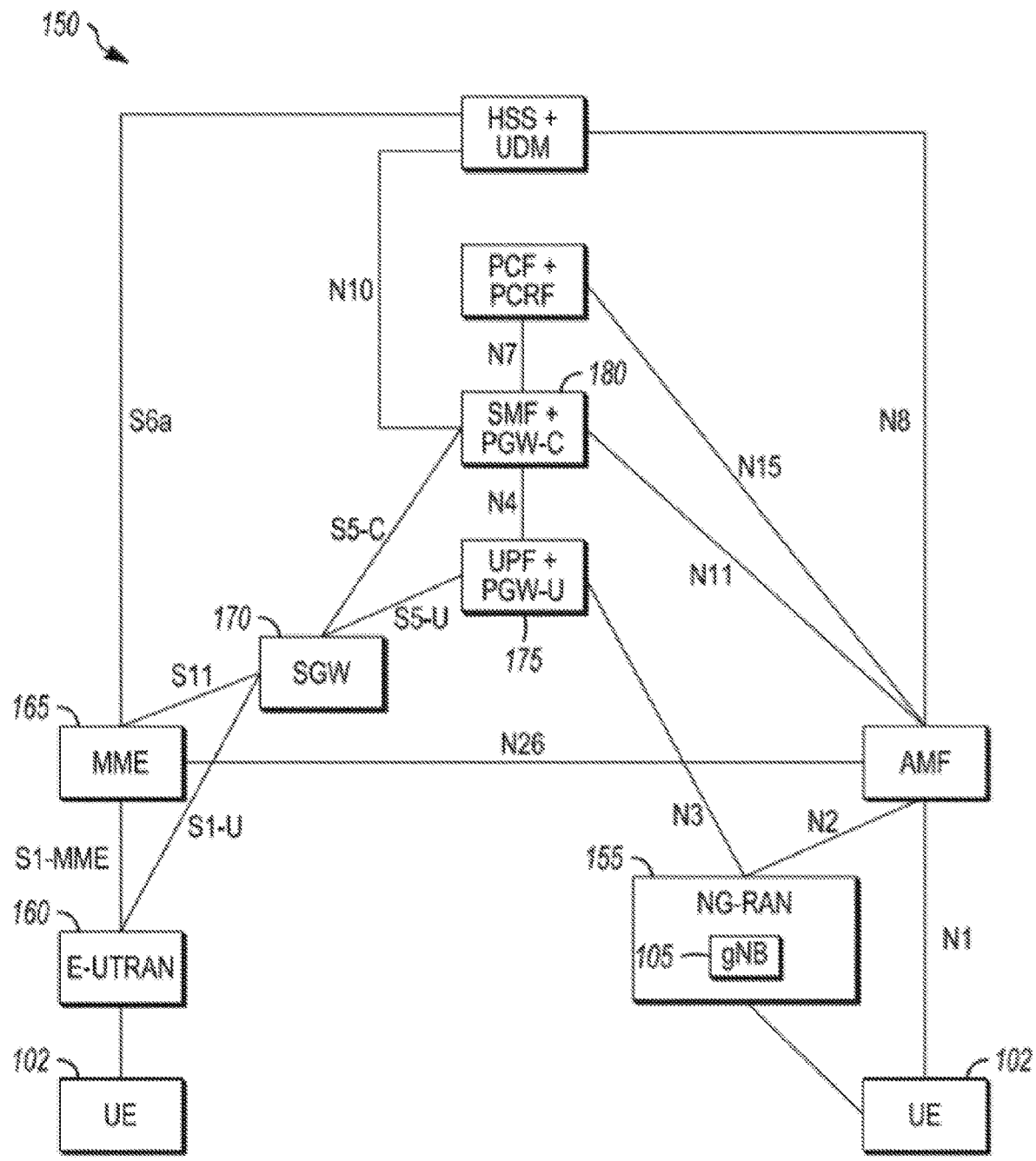
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network, a new radio (NR) network and/or Fifth Generation (5G) network. Other networks may be used in some embodiments. In some embodiments, a network may include one or more of: one or more components shown in FIG. 1A; one or more components shown in FIG. 1B; and one or more additional components. Some embodiments may not necessarily include all components shown in FIG. 1A and FIG. 1B.

The network 100 may comprise a radio access network (RAN) 101 and the core network 120 (e.g., shown as an evolved packet core (EPC)) coupled together through an Si interface 115. For convenience and brevity sake, only a portion of the core network 120, as well as the RAN 101, is shown. In some embodiments, the RAN 101 may include one or more of: one or more components of an evolved universal terrestrial radio access network (E-UTRAN), one or more components of an NR network, and/or one or more other components.

The core network 120 may include a mobility management entity (MME) 122, a serving gateway (serving GW) 124, and packet data network gateway (PDN GW) 126. In some embodiments, the networks 100, 150 may include (and/or support) one or more Evolved Node-B's (eNBs) 104 and/or one or more Next Generation Node-B's (gNBs) 105. The eNBs 104 and/or gNBs 105 may operate as base stations for communicating with User Equipment (UE) 102. In some embodiments, one or more eNBs 104 may be configured to operate as gNBs 105. Embodiments are not limited to the number of eNBs 104 shown in FIG. 1A or to the number of gNBs 105 shown in FIG. 1B. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with one or more of: a 3GPP LTE protocol/standard, an NR protocol/standard, a Fifth Generation (5G) protocol/standard; and/or other protocol/standard, although the scope of embodiments is not limited in this respect.

Descriptions herein of one or more operations, techniques and/or methods practiced by a component (such as the UE 102, eNB 104, gNB 105 and/or other) are not limiting. In some embodiments, one or more of those operations, techniques and/or methods may be practiced by another component.

The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. The serving GW 124 and the MME 122 may be implemented in one physical node or separate physical nodes.

In some embodiments, UEs 102, the eNB 104 and/or gNB 105 may be configured to communicate Orthogonal Frequency Division Multiplexing (OFDM) communication signals over a multicarrier communication channel in accordance with an Orthogonal Frequency Division Multiple Access (OFDMA) communication technique.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165, which may be similar to the MME 122 described herein, although the scope of embodiments is not limited in this respect. In some embodiments, the network 150 may include the SGW 170, which may be similar to the SGW 124 described herein, although the scope of embodiments is not limited in this respect.

Embodiments are not limited to the number or type of components shown in FIG. 1B. Embodiments are also not limited to the connectivity of components shown in FIG. 1B.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
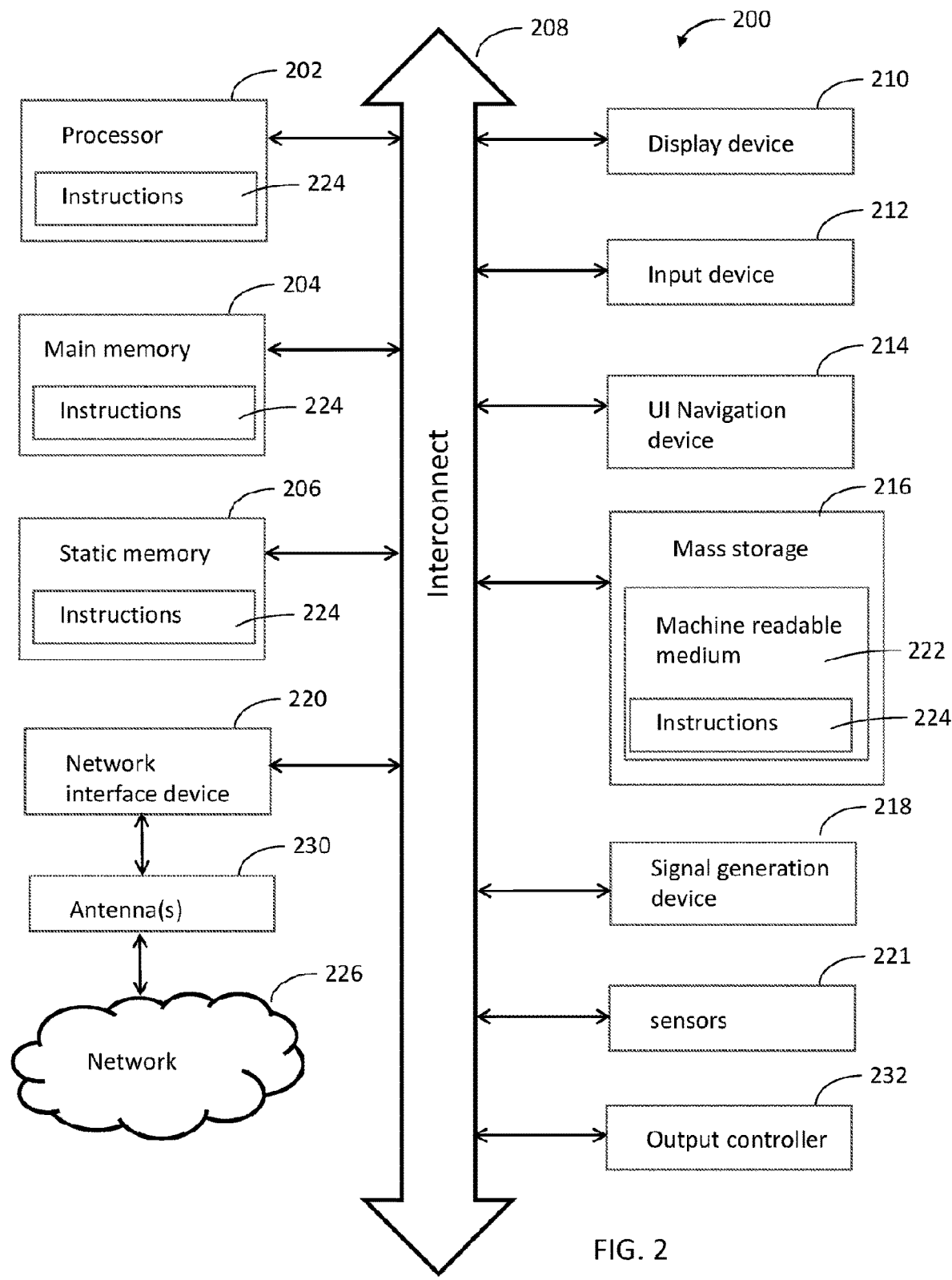
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. The machine 200 may be a UE 102, eNB 104, gNB 105, access point (AP), station (STA), user, device, mobile device, base station, another device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include one or more of 210-228.

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols. In an example, the network interface device 220 may include a plurality of antennas to wirelessly communicate using at least one of single-input multiple-output (SIMO), multiple-input multiple-output (MIND), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
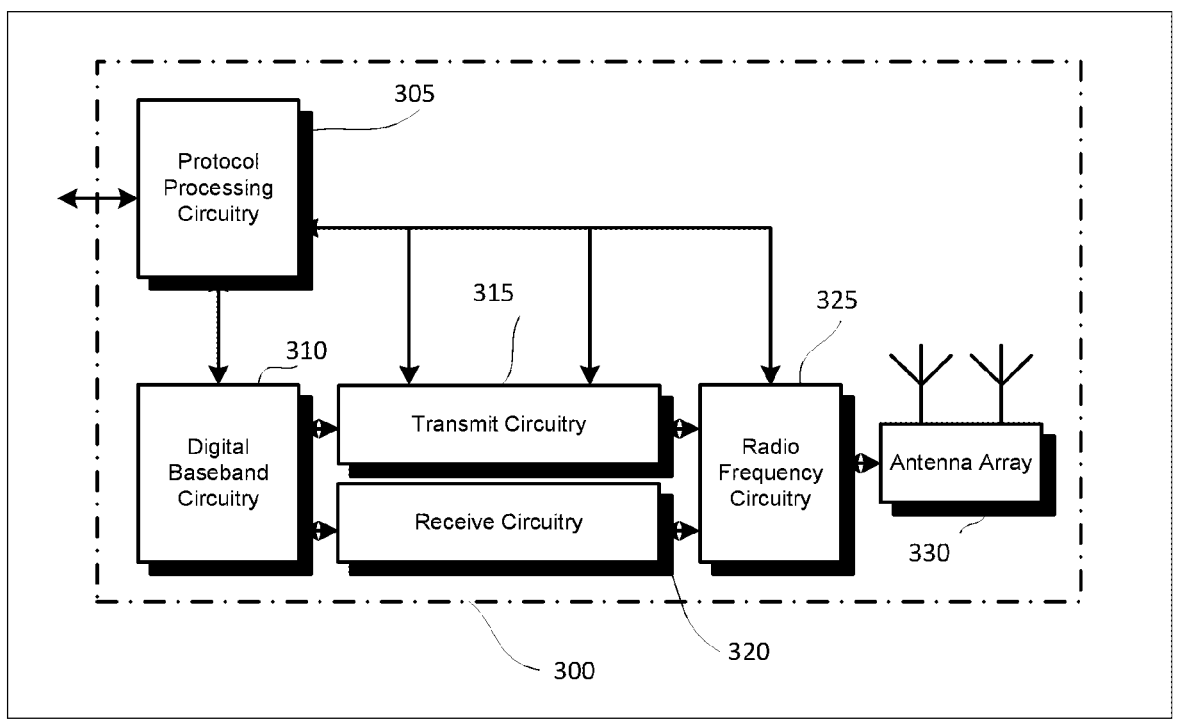
FIG. 3 illustrates an exemplary communication circuitry according to some aspects.

FIG. 3 illustrates an exemplary communication circuitry according to some aspects. It should be noted that a device, such as a UE 102, eNB 104, gNB 105, the machine 200 and/or other device may include one or more components of the communication circuitry 300, in some aspects. The communication circuitry 300 may include protocol processing circuitry 305, which may implement one or more of: medium access control (MAC), radio link control (RLC), packet data convergence protocol (PDCP), radio resource control (RRC) and non-access stratum (NAS) functions. The communication circuitry 300 may further include digital baseband circuitry 310, which may implement one or more physical layer (PHY) functions. The communication circuitry 300 may further include transmit circuitry 315, receive circuitry 320 and/or antenna array circuitry 330. The communication circuitry 300 may further include radio frequency (RF) circuitry 325. In an aspect of the disclosure, RF circuitry 325 may include multiple parallel RF chains for one or more of transmit or receive functions, each connected to one or more antennas of the antenna array 330. In some embodiments, processing circuitry may perform one or more operations described herein and/or other operation(s). In a non-limiting example, the processing circuitry may include one or more components such as the processor 202, protocol processing circuitry 305, digital baseband circuitry 310, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as transmit circuitry 315, receive circuitry 320, radio frequency circuitry 325, similar component(s) and/or other component(s).

Although the UE 102, eNB 104, gNB 105, machine 200 and/or other device described herein may each be illustrated as having several separate functional elements, one or more of the functional elements may be combined and may be implemented by combinations of software-configured elements, such as processing elements including digital signal processors (DSPs), one or more microprocessors, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, and/or other device may include various components shown in FIGS. 2-3 and/or other components. Accordingly, techniques and operations described herein that are performed by a device may be performed by an apparatus of the device, in some embodiments.

In accordance with some embodiments, the UE 102 may receive, from the gNB 105, configuration information related to a 2-step random access (RA) procedure between the UE 102 and the gNB 105 in unlicensed spectrum. The 2-step RA procedure may include: an uplink MsgA message that includes, within a random access occasion (RO), a MsgA preamble and a MsgA payload; and a downlink MsgB message that includes, within another RO, a MsgB physical downlink control channel (PDCCH) and a MsgB payload. The configuration information may indicate: resources allocated for the MsgA preamble; and a mapping between the resources allocated for the MsgA preamble and resources allocated for the MsgA payload. The UE 102 may determine the resources allocated for the MsgA payload based on the resources allocated for the MsgA preamble and the mapping. The UE 102 may transmit the MsgA preamble during an RO obtained by the UE 102, in the resources allocated for the MsgA preamble. The HE 102 may transmit the MsgA payload during the RO obtained by the UE 102, in the resources determined for the MsgA payload. These embodiments are described in more detail below.

Figure 4:
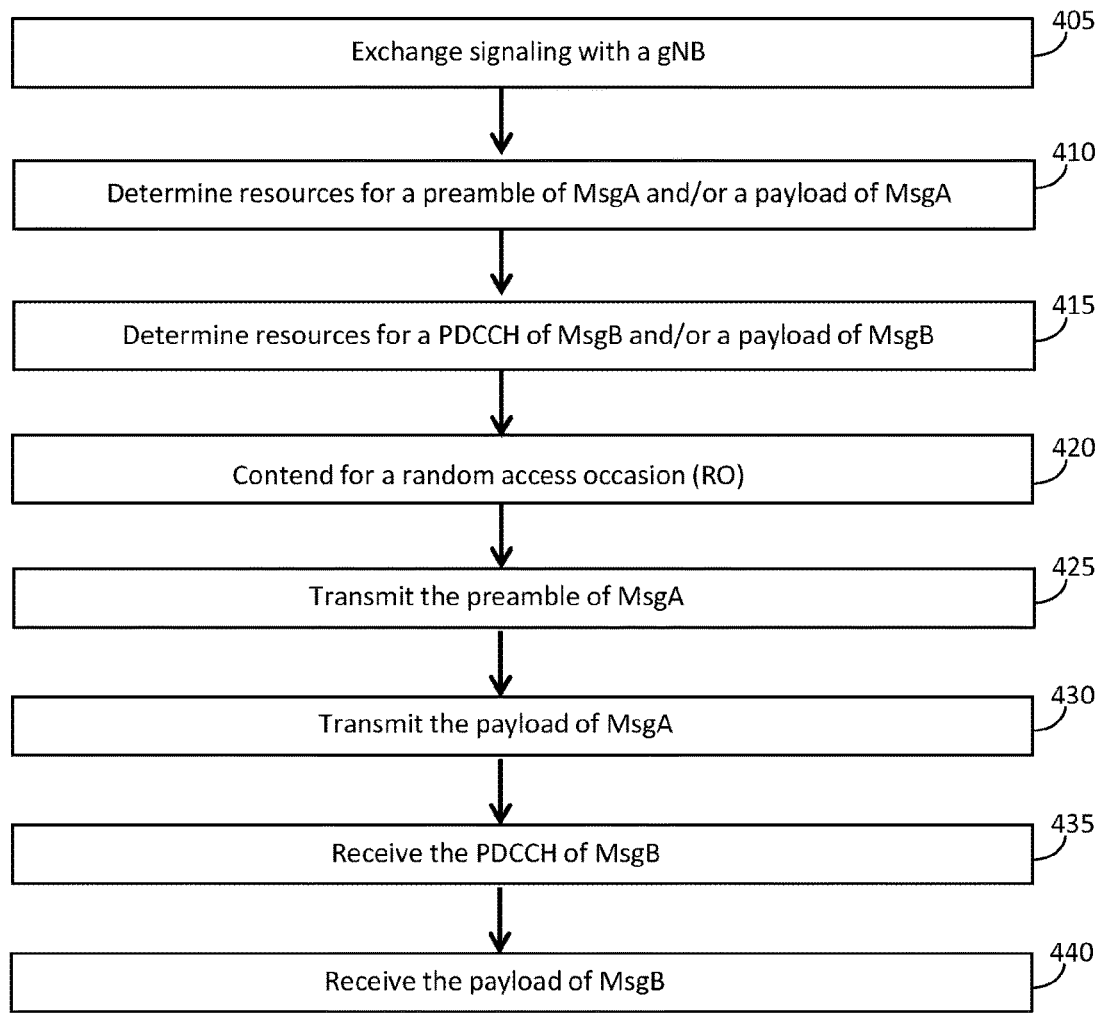
FIG. 4 illustrates the operation of a method of communication in accordance with some embodiments.
Figure 5:
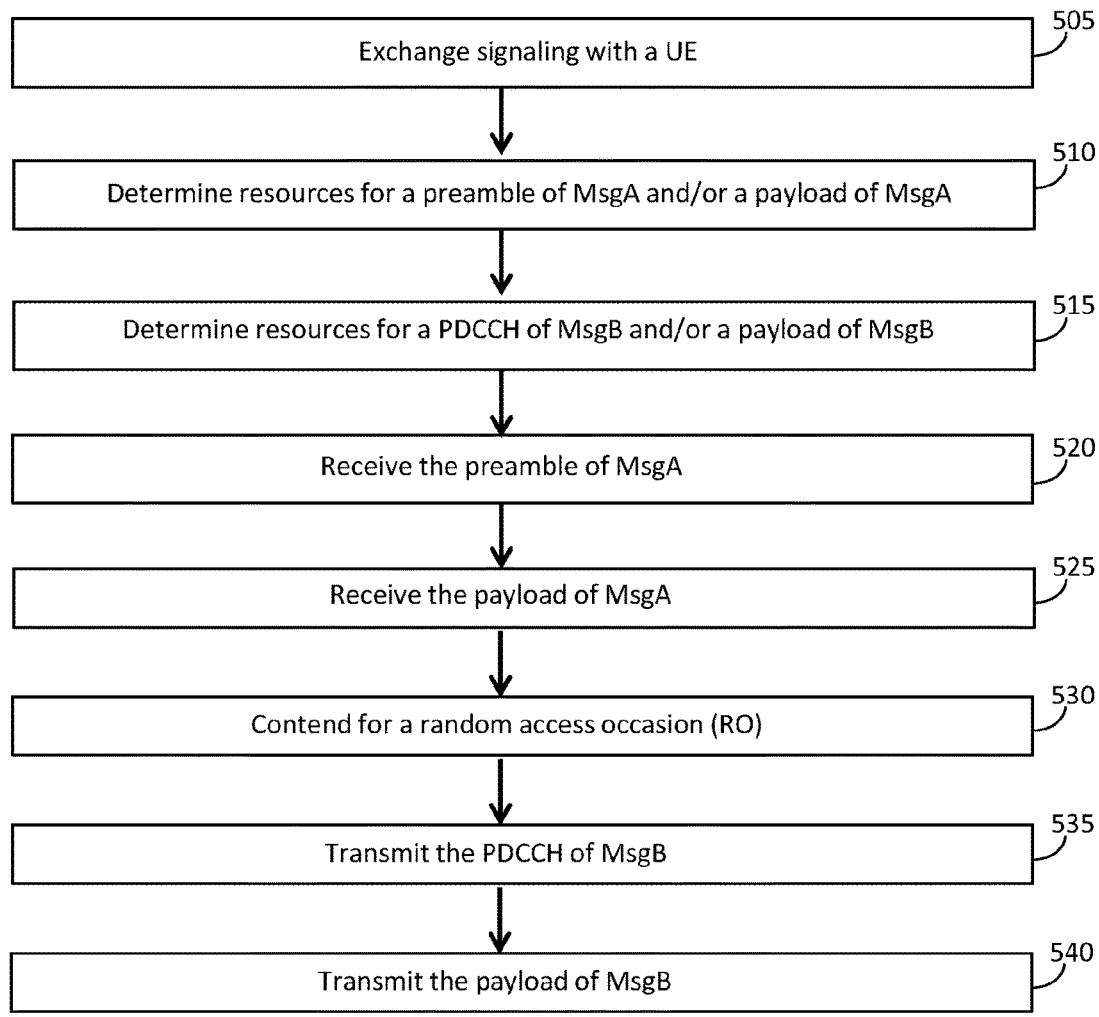
FIG. 5 illustrates the operation of a method of communication in accordance with some embodiments.

FIG. 4 illustrates the operation of a method of communication in accordance with some embodiments. FIG. 5 illustrates the operation of another method of communication in accordance with some embodiments. It is important to note that embodiments of the methods 400, 500 may include additional or even fewer operations or processes in comparison to what is illustrated in FIGS. 4-5. In addition, embodiments of the methods 400, 500 are not necessarily limited to the chronological order that is shown in FIGS. 4-5. In describing the methods 400, 500, reference may be made to one or more figures, although it is understood that the methods 400, 500 may be practiced with any other suitable systems, interfaces and components.

In some embodiments, a UE 102 may perform one or more operations of the method 400, but embodiments are not limited to performance of the method 400 and/or operations of it by the UE 102. In some embodiments, another device and/or component (such as the gNB 105, eNB 104 and/or other) may perform one or more operations of the method 400. In some embodiments, another device and/or component (such as the gNB 105, eNB 104 and/or other) may perform one or more operations that may be similar to, related to and/or reciprocal to one or more operations of the method 400. In a non-limiting example, the gNB 105 may perform an operation that may be the same as, similar to, reciprocal to and/or related to an operation of the method 400, in some embodiments. In some embodiments, the UE 102 may perform an operation that may be the same as, similar to, reciprocal to and/or related to an operation of the method 400.

In some embodiments, a gNB 105 may perform one or more operations of the method 500, but embodiments are not limited to performance of the method 500 and/or operations of it by the gNB 105. In some embodiments, another device and/or component (such as the UE 102, eNB 104 and/or other) may perform one or more operations of the method 500. In some embodiments, another device and/or component (such as the UE 102, eNB 104 and/or other) may perform one or more operations that may be similar to, related to and/or reciprocal to one or more operations of the method 500. In a non-limiting example, the UE 102 may perform an operation that may be the same as, similar to, reciprocal to and/or related to an operation of the method 500, in some embodiments. In some embodiments, the gNB 105 may perform an operation that may be the same as, similar to, reciprocal to and/or related to an operation of the method 500.

It should be noted that one or more operations of one method (such as 400, 500 and/or others described herein) may be the same as, similar to, related to and/or reciprocal to one or more operations of another method (such as 400, 500 and/or others described herein). For instance, an operation of the method 400 may be the same as, similar to, related to and/or reciprocal to an operation of the method 500, in some embodiments. In a non-limiting example, an operation of the method 400 may include reception of an element (such as a frame, block, message and/or other) by the UE 102, and an operation of the method 500 may include transmission of the same element (and/or similar element) by the gNB 105. In some cases, at least some of the descriptions of operations and techniques described as part of one method (such as 400, 500 and/or others described herein) may be relevant to another method (such as 400, 500 and/or others described herein).

The methods 400, 500 and other methods described herein may refer to eNBs 104, gNBs 105 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 400, 500 and other methods described herein may be practiced by wireless devices configured to operate in other suitable types of wireless communication systems, including systems configured to operate according to various IEEE standards such as IEEE 802.11. The methods 400, 500 may also be applicable to an apparatus of an gNB 105, an apparatus of a UE 102, an apparatus of an eNB 104, and/or an apparatus of another device described above.

In some embodiments, an apparatus of a device (including but not limited to the UE 102, eNB 104, gNB 105 and/or other) may comprise memory that is configurable to store one or more elements, and the apparatus may use them for performance of one or more operations. The apparatus may include processing circuitry, which may perform one or more operations (including but not limited to operation(s) of one or more methods (such as 400, 500 and/or other methods described herein). The processing circuitry may include a baseband processor. The baseband circuitry and/or the processing circuitry may perform one or more operations described herein. The apparatus may include a transceiver to transmit and/or receive one or more blocks, messages and/or other elements.

Embodiments are not limited by references herein to transmission, reception and/or exchanging of elements such as frames, messages, requests, indicators, signals or other elements. In some embodiments, such an element may be generated, encoded or otherwise processed by processing circuitry for transmission by a transceiver or other component cases. In some embodiments, such an element may be received by a transceiver or other component, and may be decoded, detected or otherwise processed by processing circuitry. In some embodiments, the processing circuitry and the transceiver may be included in a same apparatus. In some embodiments, the transceiver may be separate from the apparatus that comprises the processing circuitry, in some embodiments.

One or more of the elements (such as messages, operations and/or other) described herein may be included in a 3GPP protocol, 3GPP LTE protocol, 4G protocol, 5G protocol, NR protocol and/or other protocol, but embodiments are not limited to usage of those elements. In some embodiments, other elements may be used, including other element(s) in a same standard/protocol, other element(s) in another standard/protocol and/or other. In addition, the scope of embodiments is not limited to usage of elements that are included in standards.

In some embodiments, the UE 102, eNB 104 and/or gNB 105 may be arranged to operate in accordance with a 3GPP protocol, NR protocol, and/or other protocol.

At operation 405, the UE 102 may exchange signaling with the gNB 105. Such signaling may include one or more messages. In some embodiments, the UE 102 and the gNB 105 may exchange signaling multiple times. Such signaling may be exchanged at multiple times throughout the method 400. For instance, the UE 102 and the gNB 105 may exchange signaling before operations 410-415. The UE 102 and the gNB 105 may exchange additional signaling after operations 410-415 and/or at another point in the method 400.

In some embodiments, one or more operations (including operations of methods 400, 500 and/or other methods described herein) may be performed as part of a 2-step random access (RA) procedure between the UE 102 and the gNB 105, although the scope of embodiments is not limited in this respect. Although some operations are described herein as part of the 2-step RA procedure, it is understood that one or more of those operations may be performed, and may not necessarily be performed as part of the 2-step RA procedure, in some embodiments.

In some embodiments, the 2-step RA procedure may include an uplink MsgA message and a downlink MsgB message. It should be noted that the term "2-step RA procedure" is not limiting. It is understood that one or more operations of the 2-step RA procedure described herein may be related to a procedure that does not include exactly two operations. For instance, the 2-step RA procedure may include two operations, more than two operations, or less than two operations. Embodiments are also not limited to performance of "steps," as one or more "operations" may be performed as part of the 2-step RA procedure (and/or other process and/or other procedure), in some embodiments.

In addition, the terms MsgA and MsgB are used in some descriptions herein, but it is understood that the scope of embodiments is not limited by such descriptions. In some embodiments, one or more similar messages, messages with different names, different messages and/or other messages may be used.

In addition, it is understood that some messages described herein may be the same or similar, in some embodiments. In a non-limiting example, an operation based on a MsgA message and/or portions of it (such as the MsgA preamble and MsgA payload) may be the same as or similar to an operation related to an element such as a Msg1, a Msg1 message, a Msg1 preamble, Msg1 payload and/or other element, in some embodiments. In another non-limiting example, an operation based on a MsgB message and/or portions of it (such as a MsgB PDCCH, a MsgB preamble, a MsgB payload and/or other) may be the same as or similar to an operation related to an element such as a Msg2, a Msg2 message, a Msg2 PDCCH, a Msg2 preamble, a Msg2 payload and/or other.

In some embodiments, the MsgA message may include a MsgA preamble and a MsgA payload. The MsgA preamble and the MsgA payload may be transmitted by the UE 102. The MsgA preamble and the MsgA payload may be received by the gNB 105. In some embodiments, the MsgA preamble and the corresponding MsgA payload may be transmitted within a random access occasion (RO). In some embodiments, the MsgA preamble may be transmitted within a random access occasion (RO) and the MsgA payload may be transmitted in another occasion (e.g. Physical Uplink Shared Channel (PUSCH) Occasion, PO) linked to the random access occasion.

In some embodiments, the MsgB message may include a MsgB PDCCH and a MsgB payload. The MsgB PDCCH and the MsgB payload may be transmitted by the gNB 105. The MsgB PDCCH and the MsgB payload may be received by the UE 102. In some embodiments, the MsgB payload may be a physical downlink shared channel (PDSCH). In some embodiments, the MsgB payload may include a PDSCH. In some embodiments, the MsgB payload may be included in a PDSCH. In some embodiments, the MsgB preamble and the corresponding MsgB payload may be transmitted within another RO. Embodiments are not limited by the term "MsgB payload" in descriptions herein. It is understood that a PDSCH, an MsgB PDSCH and/or other element may be used, in some embodiments. Embodiments are not limited by the term "MsgB PDCCH" in descriptions herein. It is understood that a PDCCH, a MsgB preamble and/or other element may be used, in some embodiments. For instance, the MsgB message may include a MsgB preamble and a MsgB payload, in some embodiments.

In some embodiments, one or more elements may be transmitted and/or received in unlicensed spectrum, although the scope of embodiments is not limited in this respect. Although descriptions herein of some operations may refer to transmission and/or reception of some elements in unlicensed spectrum, it is understood that one or more of those elements may be transmitted and/or received in spectrum that is not necessarily unlicensed spectrum, in some embodiments (e.g licensed spectrum).

In some embodiments, the signaling at operation 405 may include configuration information. The configuration information may be transmitted by the gNB 105 and/or received by the UE 102, in some embodiments. In some embodiments, the configuration information may be included in a system information block (SIB) (such as a SIB1 and/or other) received from the gNB 105. In some embodiments, the SIB and/or other signaling may be broadcast by the gNB 105, although the scope of embodiments is not limited in this respect. In some embodiments, the configuration information may be included in dedicated signaling received from the gNB 105. Embodiments are not limited to the above, however, as the configuration information may be included in any suitable message/element, in some embodiments.

In some embodiments, the configuration information may indicate one or more of: resources allocated for the MsgA preamble; information related to a mapping between the resources allocated for the MsgA preamble and resources allocated for the MsgA payload; information related to a type of multiplexing between the resources allocated for the MsgA preamble and resources allocated for the MsgA payload; and/or other. In some embodiments, resources (such as resources of the MsgA preamble, resources of the MsgA payload, resources of the MsgB PDCCH, resources of the MsgB payload and/or other) may include time resources and/or frequency resources.

In some embodiments, the configuration information may indicate one or more of: resources (including but not limited to time and frequency domain resources) allocated for the MsgA preamble; resources (including but not limited to time and frequency domain resources) allocated for the MsgA payload; a relationship between the resources of the MsgA preambles and the resources of the MsgA payload; a relationship between a number of transmissions of a MsgA preamble and a number of transmissions of a MsgA payload; and/or other. It should be noted that "resources" in descriptions herein may be replaced by "radio resources," in some cases. For instance, the resources may be radio resources or may include radio resources.

In some embodiments, the signaling at operation 405 may include one or more of: radio resource control (RRC) message(s), downlink control information (DCI), physical downlink control channel (PDCCH) and/or other element(s). Information included in the signaling may include, but is not limited to, one or more of: configuration information for a 2-step RA procedure; information related to resources of the preamble of MsgA, resources of the payload of MsgA, resources of the PDCCH of MsgB, resources of the payload of MsgB, and/or other resources; information related to a number of transmissions of an element (such as the preamble of MsgA, the payload of MsgA, the PDCCH of MsgB, the payload of MsgB and/or other); one or more other elements described herein; and/or other element(s).

At operation 410, the UE 102 may determine resources for a preamble of a MsgA and/or a payload of MsgA. At operation 415, the UE 102 may determine resources for a PDCCH of MsgB and/or a payload of MsgB.

In some embodiments, the UE 102 may determine the resources allocated for the MsgA payload based on the resources allocated for the MsgA preamble and the mapping. In some embodiments, the mapping may be related to the type of multiplexing between the resources allocated for the MsgA preamble and resources allocated for the MsgA payload. In some embodiments, the UE 102 may determine the resources allocated for the MsgA payload based on the resources allocated for the MsgA preamble and the type of multiplexing. In some embodiments, the type of multiplexing may be one of: time division multiplexing (TDM); frequency division multiplexing (FDM); a combination of TDM and FDM; and/or other. In some embodiments, the mapping may be based on TDM, FDM, the combination of TDM and FDM; and/or other.

Any suitable arrangements of TDM, FDM or a TDM/FDM combination may be used. In a non-limiting example, if the mapping is based on TDM (and/or if the type of multiplexing is TDM), the resources of the MsgA preamble and the resources of the MsgA payload may be consecutive in time, and may be in a same frequency range. In another non-limiting example, if the mapping is based on FDM (and/or if the type of multiplexing is FDM), the resources of the MsgA preamble and the resources of the MsgA payload may be in different frequency ranges, and may be in a same time instance. In another non-limiting example, if the mapping is based on the combination of TDM and FDM (and/or if the type of multiplexing is the combination of TDM and FDM): the resources of the MsgA preamble and the resources of the MsgA payload may be consecutive in time, and may be in different frequency ranges.

At operation 420, the UE 102 may contend for a random access occasion (RO). Any suitable techniques, including but not limited to listen-before-talk (LBT), may be used at operation 420.

At operation 425, the UE 102 may transmit the preamble of the MsgA. At operation 430, the UE 102 may transmit the payload of the MsgA. In some embodiments, the UE 102 may transmit the preamble of the MsgA and the payload of the MsgA in a same RO, although the scope of embodiments is not limited in this respect.

In some embodiments, the UE 102 may perform one or more of: transmit the MsgA preamble during an RO obtained by the UE 102, in the resources allocated for the MsgA preamble; transmit the MsgA payload during the RO obtained by the UE, in the resources allocated for the MsgA preamble; and/or other.

In some embodiments, (including but not limited to embodiments in which the configuration information is included in a SIB and/or other broadcast signaling), the UE 102 may perform one or more of: initiate the 2-step RA procedure to initiate a radio resource control (RRC) setup process, an RRC resumption, an RRC re-establishment, and/or other; encode the MsgA payload to include an RRC setup request message, an RRC resumption request message, an RRC re-establishment request message, and/or other RRC message; and/or other.

In some embodiments, the configuration information may be included in dedicated signaling received from the gNB 105 (including but not limited to dedicated signaling received from the gNB 105 while the UE 102 operates in an RRC connected mode). Examples of dedicated signaling may include, but are not limited to: an RRC reconfiguration request message, a medium access control (MAC) control element (CE), and a physical downlink control channel (PDCCH).

In some embodiments, the configuration information may indicate a relationship or mapping between radio resources of the MsgA preambles and radio resources of the MsgA payload. In some embodiments, the relationship may be in a group that includes one or more of: one radio resources for the transmission of MsgA payload per one radio resources for the transmission of MsgA preamble (i.e. 1 to 1 mapping between radio resources of the MsgA preamble transmission and radio resources of the MsgA payload transmission); multiple radio resources for the transmission of MsgA payload per one radio resources for the transmission of MsgA preamble (i.e. 1 to many mapping between radio resources of the MsgA preamble transmission and radio resources of the MsgA payload transmission); multiple radio resources for the transmission of MsgA payload per multiple radio resources for the transmission MsgA preamble; one radio resources for the transmission of MsgA payload per multiple radio resources for the transmission of MsgA preamble (Many to 1 mapping between the radio resources for the MsgA preamble transmission and the radio resources for the MsgA payload transmission); and/or other. In some embodiments, the relationship or mapping may be related to a number of transmissions of MsgA preambles and a number of transmissions of MsgA payload.

At operation 435, the UE 102 may receive the PDCCH of a MsgB. At operation 440, the UE 102 may receive the payload of the MsgB.

For clarity in the discussion below, the RO obtained by the UE 102 is referred to, without limitation, as a first RO. The UE 102 may perform one or more of: transmit the MsgA preamble and/or MsgA payload during the first RO; detect the MsgB PDCCH during a second RO obtained by the gNB 105; based on detection of the MsgB PDCCH and/or other, determine a timing synchronization for the MsgB payload; decode the MsgB payload, wherein the MsgB payload may be received during the second RO based on the determined timing synchronization; and/or other.

It should be noted that descriptions herein may refer to transmission/reception of elements (such as MsgA preamble, MsgA payload, MsgB PDCCH, MsgB payload and/or other) during an RO, but the scope of embodiments is not limited in this respect. It is understood that one or more elements (including but not limited to the MsgA preamble, MsgA payload, MsgB PDCCH, and MsgB payload) may be transmitted/received, and may not necessarily be transmitted/received within an RO, in some embodiments.

In some embodiments, the configuration information may indicate resources allocated for the MsgB PDCCH. In some embodiments, the configuration information may indicate resources allocated for the MsgB payload.

In some embodiments, the UE 102 may determine resources allocated for the MsgB payload based on a random access radio network temporary identifier (RA-RNTI) of downlink control information (DCI) in the MsgB PDCCH.

In some embodiments, the MsgB payload may include one or more of: an RRC setup response message, an RRC resumption response message, an RRC re-establishment response message, another RRC message, one or more other messages, one or more other elements, and/or other.

In some embodiments, the configuration information may indicate a relationship or mapping between the time and/or frequency domain resources of the MsgA preamble transmission and the time and/or frequency domain resources of the MsgA payload transmission, wherein the relationship is in a group that includes one or more of: one time and/or frequency resources of the MsgA payload transmission per one time and/or frequency resources of the MsgA preamble transmission; multiple time and/or frequency resources of the MsgA payload transmission per one time and/or frequency resources of the MsgA preamble transmission; one time and/or frequency resources of the MsgA payload transmission per multiple time and/or frequency resources of the MsgA preamble transmissions; and/or other.

In some embodiments, the UE 102 may receive the MsgB PDCCH from the gNB 105. The UE 102 may, based on reception of the MsgB PDCCH, determine an allocation of time and frequency resources for the MsgB payload. The UE 102 may receive the MsgB payload based on the determined time and frequency resources of the MsgB payload.

In some embodiments, the configuration information may indicate resources allocated for the MsgB PDCCH. The UE 102 may determine resources allocated for the MsgB payload based on a random access radio network temporary identifier (RA-RNTI) of downlink control information (DCI) in the MsgB PDCCH.

At operation 505, the gNB 105 may exchange signaling with the UE 102. At operation 510, the gNB 105 may determine resources for a preamble of a MsgA and/or a payload of MsgA. At operation 515, the gNB 105 may determine resources for a PDCCH of MsgB and/or a payload of MsgB. At operation 520, the gNB 105 may receive the preamble of the MsgA. At operation 525, the gNB 105 may receive the payload of the MsgA. At operation 530, the gNB 105 may contend for an RO. At operation 535, the gNB 105 may transmit the PDCCH of the MsgB. At operation 540, the gNB 105 may transmit the payload of the MsgB.

In some embodiments, the gNB 105 may allocate resources for a MsgA preamble of an uplink MsgA message and resources for a MsgA payload of the MsgA message.

The MsgA message may be included in a 2-step random access (RA) procedure, although the scope of embodiments is not limited in this respect. In some embodiments, the 2-step RA procedure may further include a downlink MsgB message. In some embodiments, the MsgB message may include a MsgB PDCCH and a MsgB payload. In some embodiments, the gNB 105 may transmit signaling that indicates one or more of: the resources allocated for the MsgA preamble, the resources allocated for the MsgA payload, and/or other. In some embodiments, the signaling may include one or more of: broadcast signaling, a system information block (SIB), dedicated signaling, and/or other.

In some embodiments, the gNB 105 may perform one or more of: during a first RO, detect the MsgA preamble in the resources allocated for the MsgA preamble; based on the detection of the MsgA preamble and/or other, determine a synchronization timing for reception of the MsgA payload; during the first RO and in accordance with the synchronization timing, detect the MsgA preamble in the resources allocated for the MsgA payload; content for a second RO; transmit, in the second RO, the MsgB PDCCH and the MsgB payload; and/or other.

In some embodiments, the gNB 105 may allocate the resources for the MsgA preamble and the resources for the MsgA payload in accordance with a type of multiplexing. Non-limiting examples of the type of multiplexing may include, but are not limited to: TDM, FDM, a combination of TDM and FDM, and/or other.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus, comprising:
  a processor configured to cause the apparatus to:
    receive, from a base station, configuration information related to a 2-step random access (RA) procedure between the apparatus and the base station, wherein the configuration information indicates:
      resources allocated for MsgA preamble transmissions, and
      information related to a mapping between the resources allocated for the MsgA preamble transmissions and resources allocated for MsgA payload transmissions, wherein the resources allocated for Msg A payload transmissions include a plurality of frequency multiplexed resources;
    determine a first resource for a MsgA preamble within resources allocated for the MsgA preamble transmissions;
    determine a second resource for a MsgA payload based on the first resource for the MsgA preamble transmissions and the mapping; and
    transmit, to the base station, the MsgA preamble in the first resource and the MsgA payload in the second resource.

2. The apparatus of claim 1, wherein the 2-step RA procedure includes:
  an uplink MsgA message that includes the MsgA preamble and the MsgA payload; and
  a downlink MsgB message that includes a MsgB physical downlink control channel (PDCCH) and a MsgB payload.

3. The apparatus of claim 1, wherein a first plurality of the resources allocated for the MsgA preamble transmission are mapped to one of the plurality of frequency multiplexed resources of the resources allocated for the MsgA payload transmissions.

4. The apparatus of claim 1, wherein the mapping is based on time division multiplexing (TDM), frequency division multiplexing (FDM), or a combination of TDM and FDM.

5. The apparatus of claim 1, wherein the configuration information is included in a system information block (SIB).

6. The apparatus of claim 1, wherein:
  the resources allocated for the MsgA preamble transmissions include at least one of time resources or frequency resources; and
  the resources allocated for the MsgA payload transmissions include at least one of time resources or frequency resources.

7. The apparatus of claim 1, wherein the configuration information is included in dedicated signaling.

8. The apparatus of claim 1, further comprising a radio communicatively coupled to the processor.

9. A method, comprising:
  receiving, from a base station, configuration information related to a 2-step random access (RA) procedure between an apparatus and the base station, wherein the configuration information indicates:
    resources allocated for MsgA preamble transmissions, and
    information related to a mapping between the resources allocated for the MsgA preamble transmissions and resources allocated for MsgA payload transmissions, wherein the resources allocated for Msg A payload transmissions include a plurality of frequency multiplexed resources;
  determine a first resource for a MsgA preamble within resources allocated for the MsgA preamble transmissions;
  determine a second resource for a MsgA payload based on the first resource for the MsgA preamble transmissions and the mapping; and
  transmit, to the base station, the MsgA preamble in the first resource and the MsgA payload in the second resource.

10. The method of claim 9, wherein the 2-step RA procedure includes:
  an uplink MsgA message that includes the MsgA preamble and the MsgA payload; and
  a downlink MsgB message that includes a MsgB physical downlink control channel (PDCCH) and a MsgB payload.

11. The method of claim 9, wherein a first plurality of the resources allocated for the MsgA preamble transmission are mapped to one of the plurality of frequency multiplexed resources of the resources allocated for the MsgA payload transmissions.

12. The method of claim 9, wherein the mapping is based on time division multiplexing (TDM), frequency division multiplexing (FDM), or a combination of TDM and FDM.

13. The method of claim 9, wherein the configuration information is included in a system information block (SIB).

14. The method of claim 9, wherein the configuration information is included in dedicated signaling.

15. A method, comprising:
  transmitting configuration information related to a 2-step random access (RA) procedure between an apparatus and the base station, wherein the configuration information indicates:

resources allocated for MsgA preamble transmissions, and information related to a mapping between the resources allocated for the MsgA preamble transmissions and resources allocated for MsgA payload transmissions, wherein the resources allocated for Msg A payload transmissions include a plurality of frequency multiplexed resources, wherein the configuration information is useable to:

determine a first resource for a MsgA preamble within resources allocated for the MsgA preamble transmissions; and determine a second resource for a MsgA payload based on the first resource for the MsgA preamble transmissions and the mapping; and receiving the MsgA preamble in the first resource and the MsgA payload in the second resource.

16. The method of claim 15, wherein the 2-step RA procedure includes:

an uplink MsgA message that includes the MsgA preamble and the MsgA payload; and a downlink MsgB message that includes a MsgB physical downlink control channel (PDCCH) and a MsgB payload.

17. The method of claim 15, wherein a first plurality of the resources allocated for the MsgA preamble transmission are mapped to one of the plurality of frequency multiplexed resources of the resources allocated for the MsgA payload transmissions.

18. The method of claim 15, wherein the mapping is based on time division multiplexing (TDM), frequency division multiplexing (FDM), or a combination of TDM and FDM.

19. The method of claim 15, wherein the configuration information is included in a system information block (SIB).

20. The method of claim 15, wherein the configuration information is included in dedicated signaling.

* * * * *